(12) United States Patent
Lee et al.

(10) Patent No.: US 10,256,441 B2
(45) Date of Patent: Apr. 9, 2019

(54) RECHARGEABLE BATTERY (71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 45 days.

(21) Appl. No.: 15/212,309

(22) Filed: Jul. 18, 2016

(65) Prior Publication Data
US 2017/0084887 A1 Mar. 23, 2017

(30) Foreign Application Priority Data

Sep. 17, 2015 (KR) .......................... 10-2015-0131631

(51) Int. Cl.
| H01M 2/04 | (2006.01) |
|---|---|
| H01M 2/06 | (2006.01) |
| H01M 2/12 | (2006.01) |
| H01M 2/26 | (2006.01) |
| H01M 2/30 | (2006.01) |

(52) U.S. Cl.
CPC ....... H01M 2/0426 (2013.01); H01M 2/0456 (2013.01); H01M 2/0439 (2013.01); H01M 2/0473 (2013.01); H01M 2/0486 (2013.01)

(58) Field of Classification Search
CPC ............. H01M 2/0426; H01M 2/0439; H01M 2/0456; H01M 2/0473; H01M 2/0486
See application file for complete search history.

(56) References Cited

U.S. PATENT DOCUMENTS

| 2009/0186269 | A1* | 7/2009 | Kim | ...................... H01M 2/043 429/179 |
|---|---|---|---|---|
| 2010/0143786 | A1 | 6/2010 | Kim | |
| 2011/0206957 | A1* | 8/2011 | Byun | ..................... H01M 2/043 429/56 |
| 2013/0260220 | A1* | 10/2013 | Ahn | ........................ H01M 2/04 429/164 |
| 2015/0311481 | A1* | 10/2015 | Qu | ..................... H01M 2/0473 429/89 |

FOREIGN PATENT DOCUMENTS

| KR | 10-0635744 B1 | 10/2006 |
|---|---|---|
| KR | 10-0686853 | * 2/2007 |
| KR | 10-0686853 B1 | 2/2007 |
| KR | 10-2010-0065669 A | 6/2010 |
| KR | 10-1155887 B1 | 6/2012 |

OTHER PUBLICATIONS

English translation KR Publication 10-0686853, Feb. 2007.*

* cited by examiner

*Primary Examiner* — Brittany L Raymond
(74) *Attorney, Agent, or Firm* — Lee & Morse P.C.

(57) ABSTRACT

An exemplary embodiment provides a rechargeable battery including a case including an internal space and an opening and a cap plate coupled to the case to cover the opening. The cap plate may include a first portion having a first thickness, and a second portion continuously disposed along an edge of the cap plate and having a second thickness that is thicker than the first thickness.

10 Claims, 8 Drawing Sheets

RECHARGEABLE BATTERY

CROSS-REFERENCE TO RELATED APPLICATION

Korean Patent Application No. 10-2015-0131631, filed on Sep. 17, 2015, in the Korean Intellectual Property Office, and entitled: "Rechargeable Battery," is incorporated by reference herein in its entirety.

BACKGROUND

1. Field

Embodiments relate to a rechargeable battery including a cap plate with improved strength.

2. Description of the Related Art

Typically, a rechargeable battery is manufactured by accommodating an electrode assembly inside a case (or a can) and mounting a cap plate in an opening of the case.

In this case, the cap plate may include a terminal connected to the electrode assembly, a vent for discharging an internal gas of the case, and an electrolyte injection opening for injecting a necessary electrolyte solution into the case.

SUMMARY

Embodiments are directed to a rechargeable battery including: a case including an internal space and an opening; and a cap plate coupled to the case to cover the opening. The cap plate may have: a first portion having a first thickness; and a second portion continuously disposed along an edge of the cap plate and having a second thickness that is thicker than the first thickness.

The second portion may have a first barrier that protrudes toward the internal space of the case from a first surface of the cap plate.

The second portion may include: a first barrier protruding toward the internal space from a first surface of the cap plate; and a second barrier protruding from a second surface of the cap plate which is opposite the first surface of the cap plate and faces an outside of the case.

A circumferential surface of the first barrier may coincide with a circumferential surface of the cap plate.

A circumferential surface of the first barrier may not coincide with a circumferential surface of the cap plate.

Circumferential surfaces of the first barrier, the second barrier, and the cap plate may coincide with each other.

Circumferential surfaces of the first barrier, the second barrier, and the cap plate may not coincide with each other.

The cap plate may have a terminal hole and a vent hole, and a third portion may be disposed along a circumference of the terminal hole and a circumference of the vent hole, the third portion having a third thickness that is thicker than the first thickness.

The third portion may include a third barrier protruding toward the internal space from the first surface of the cap plate.

Another exemplary embodiment is directed to a rechargeable battery including: a case including an internal space and an opening; and a cap plate coupled to the case to cover the opening, the cap plate having a terminal hole and a vent hole. The cap plate may have: a first portion having a first thickness; a second portion continuously disposed along an edge of the cap plate and having a second thickness that is thicker than the first thickness; and a third portion continuously disposed along an edge of the terminal hole and an edge of the vent hole and having a third thickness that is thicker than the first thickness.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will also be understood that when an element is referred to as being "between" two components, it can be the only element between the two components, or one or more intervening elements may also be present.

Unless explicitly described to the contrary, the word "comprise" and variations such as "comprises" or "comprising" will be understood to imply the further inclusion of other elements. Like reference numerals refer to like elements throughout.

Figure 1:
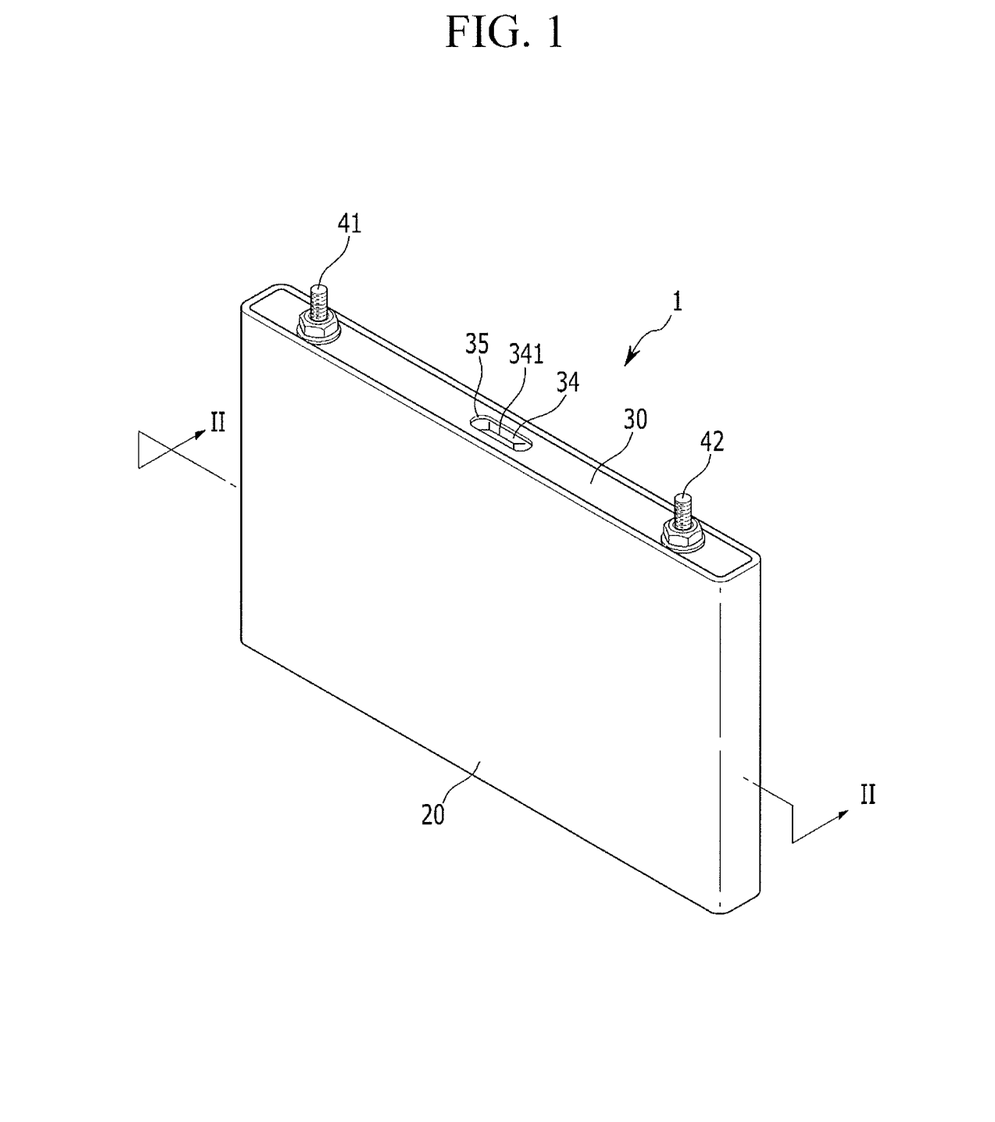
FIG. 1 illustrates a perspective view of a rechargeable battery according to a first exemplary embodiment.
Figure 2:
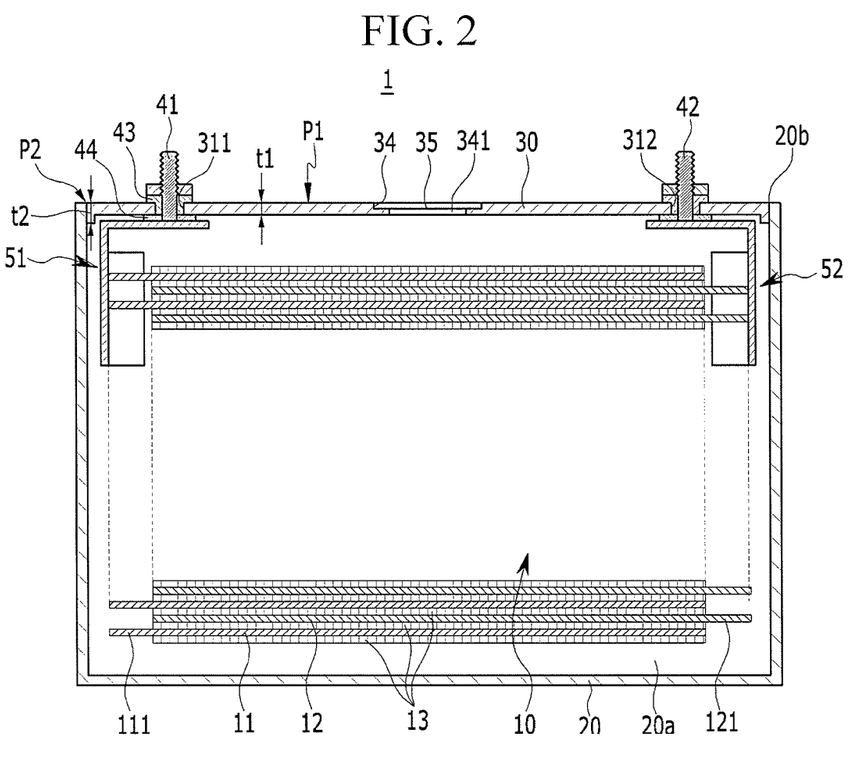
FIG. 2 illustrates a cross-sectional view taken along a line II-II of FIG. 1.

FIG. 1 is a perspective view of a rechargeable battery according to a first exemplary embodiment, and FIG. 2 is a cross-sectional view taken along a line II-II of FIG. 1.

Referring to FIG. 1 and FIG. 2, the rechargeable battery 1 includes a case 20 for accommodating an electrode assembly 10 in an internal space 20a, a cap plate 30 for closing and sealing the case 20 by covering an opening 20b located at one side of the case 20, electrode terminals 41 and 42 mounted in terminal holes 311 and 312, respectively, and lead tabs 51 and 52 for respectively connecting the electrode terminals 41 and 42 to the electrode assembly 10.

The electrode assembly 10 may include a separator 13 serving as an insulator and an electrode 11, which may be positive, for example, and an electrode 12, which may be negative, for example, disposed on opposite surfaces of the separator 13, and may be formed in a jelly-roll shape by spiral-winding and pressing the positive electrode 11, the negative elective electrode 13, and the separator 13.

Each of the positive electrode 11 and the negative electrode 12 includes a current collector formed of a metal coil of a thin plate, and an active material which is coated on a surface of the current collector. Further, the positive electrode 11 and negative electrode 12 include, on the current collector, a coated region on which the active material is coated, and uncoated regions 111 and 121 on which no active material is coated.

The coated regions occupy a majority of portions of the positive electrode 11 and the negative electrode 12. The uncoated regions 111 and 121 may be respectively disposed at opposite sides of the coated region of the jelly-roll shaped electrode assembly 10. For example, the electrode assembly 10 may be manufactured to have a shape that substantially corresponds to a cuboid by forming a front surface and a back surface to have a wide area and forming ends of the uncoated regions 111 and 121, serving as left and right surfaces, to have a narrow longitudinal area in the jelly-roll shape.

The case 20 establishes an outer appearance of the rechargeable battery 1, and may be made of a conductive metal such as aluminum, an aluminum alloy, or nickel-plated steel. Further, the case 20 includes the internal space 20a in which the electrode assembly 10 can be accommodated.

For example, the case 20 may be formed to have a cuboid shape including the opening 20b located at one side to accommodate the cuboid shaped electrode assembly 10. The opening 20b is located at a top of the case 20 with respect to FIG. 1 and FIG. 2.

The cap plate 30 is a thin plate, and is coupled to the opening 20b to close and seal the case 20. As a result, an interior and an exterior are blocked by the cap plate 30.

Elements for forming and operating the rechargeable battery 1 are formed in the cap plate 30. For example, the terminal holes 311 and 312 for exposing the electrode terminals 41 and 42 to the outside, an electrolyte injection opening (not shown) for injecting an electrolyte solution into the internal space 20a, and a vent hole 35 for acquiring stability of the rechargeable battery 1 when an internal pressure of the rechargeable battery 1 is increased are formed in the cap plate 30.

The terminal holes 311 and 312 extend through the cap plate 30 to facilitate the insertion of the electrode terminals 41 and 42. The electrode terminals 41 and 42 are respectively mounted in the terminal holes 311 and 312 with an external insulator 43 and an internal insulator 44 interposed therebetween. The external insulator 43 and the internal insulator 44 have an electrically insulating structure between the electrode terminal 41 and 42 and the cap plate 30.

The electrode terminals 41 and 42 are electrically connected to the electrode assembly 10 through the terminal holes 311 and 312 in the case 20 and protrude to the outside of the case 20. The electrode terminals 41 and 42 respectively include a positive terminal 41, for example, connected to the positive electrode 11 and a negative terminal 42, for example, connected to the negative electrode 12.

The terminal holes 311 and 312, the internal insulator 44, and the external insulator 43 may have the same structure at respective sides of the positive terminal 41 and the negative terminal 42.

The cap plate 30 has a first surface S1 which faces the internal space 20a of the case 20, and a second surface S2 which is opposite the first surface S1 to face an outside of the case 20.

The external insulator 43 is disposed on the second surface S2 of the cap plate 30 and is partially inserted into the terminal hole 311 to electrically insulate the positive terminal 41 from the cap plate 30. Specifically, the external insulator 43 electrically insulates the external circumferential surface of the positive terminal 41 from the second surface S2 of the cap plate 30, and also electrically insulates an external circumferential surface of the positive terminal 41 from an interior circumferential surface of the terminal hole 311 which faces the external circumferential surface of the positive terminal 41.

The internal insulator 44 is brought into surface contact with the first surface S1 of the cap plate 30 to insulate the cap plate 30 disposed around the terminal hole 311 from the lead tab 51 which faces the cap plate 30. Specifically, the internal insulator 44 electrically insulates a top surface of the lead tab 51 from the first surface S1 of the cap plate 30, and also electrically insulates the external circumferential surface of the positive terminal 41 from an interior circumferential surface of the cap plate 30.

The lead tabs 51 and 52 are connected to the electrode terminals 41 and 42 on one side, and are connected on the other side to the uncoated regions 111 and 121 at opposite ends of the electrode assembly 10. For example, a pair of lead tabs 51 and 52 are provided to respectively connect the positive electrode 11 and the negative electrode 12 to the positive terminal 41 and the negative terminal 42.

The vent hole 35 is closed and sealed by a vent plate 34 such that the vent hole is closed when the rechargeable battery 1 is operated normally, and the vent hole is opened when the internal pressure is increased. For example, the vent plate 34 is formed of a plate that is thinner than the cap plate 30 to be bonded to the vicinity of the vent hole 35.

When the internal pressure of the case 20 is increased by a gas generated in the rechargeable battery 1 due to charge and discharge of the electrode assembly 10 to be equal to or greater than a predetermined level, the vent plate 34 is broken by the internal pressure to release the gas generated in the rechargeable battery 1. Accordingly, the explosion of the rechargeable battery 1 may be prevented.

The vent plate 34 may include a notch 341 having various structures for guiding quick breakage of the vent plate 34 at the predetermined internal pressure.

The cap plate 30 has a structure for improving the strength thereof. This strength-improving structure may be realized by differently the thickness of each portion of the cap plate 30. For example, in the cap plate 30, a portion having a first thickness t1 is referred to as a first portion P1 and a portion having a second thickness t2 is referred to as a second portion P2. The second thickness t2 is thicker than the first thickness t1. The second portion P2 may be continuous along an edge of the cap plate 30.

Figure 3:
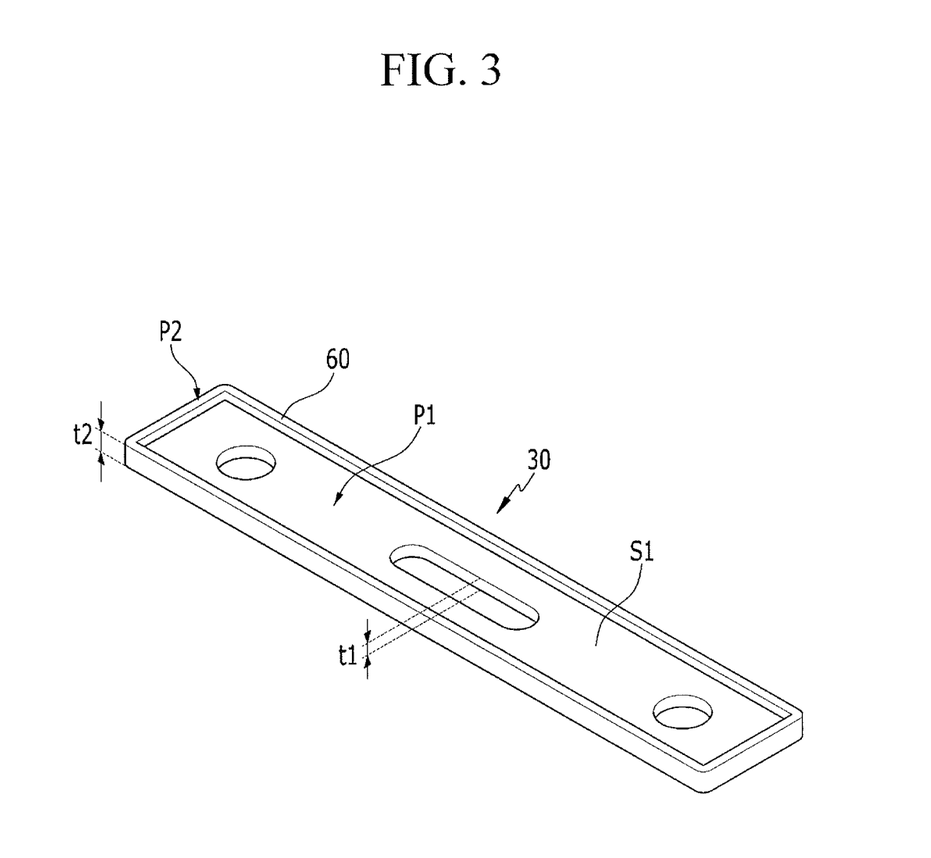
FIG. 3 illustrates a bottom perspective view illustrating a cap plate according to the first exemplary embodiment.

Referring to FIG. 3, the second portion P2 includes a first barrier 60 having a band-like shape that protrudes from the first surface S1 of the cap plate 30 and is connected along the edge of the cap plate 30 without being cut off. The second thickness t2 may substantially correspond to the sum of the first thickness t1 and a thickness of the first barrier 60. FIG. 3 illustrates that the first barrier 60 has a constant thickness along the edge of the cap plate 30, but the shape of the first barrier 60 is not limited thereto. The first barrier 60 may have any shape in which the second portion P2 is thicker than the first portion P1.

The first barrier 60 may be integral to the second portion P2 of the cap plate 30. In this case, the first barrier 60 may be located on the cap plate 30 such that a circumferential surface thereof coincides with a circumferential surface of the cap plate 30 as shown in FIG. 3, or the first barrier 60 may be located on the cap plate 30 such that the circumferential surface thereof does not coincide with the circumferential surface of the cap plate 30. In other words, the first barrier 60 may be located inside the cap plate 30 and around an edge of the cap plate 30, as shown in FIG. 4.

By employing the strength-improving structure with different thicknesses of each portion, deformation of this cap plate 30 due to an external force such as an external impact can be prevented, and deformation of the outer appearance of the rechargeable battery can also be prevented.

Figure 5:
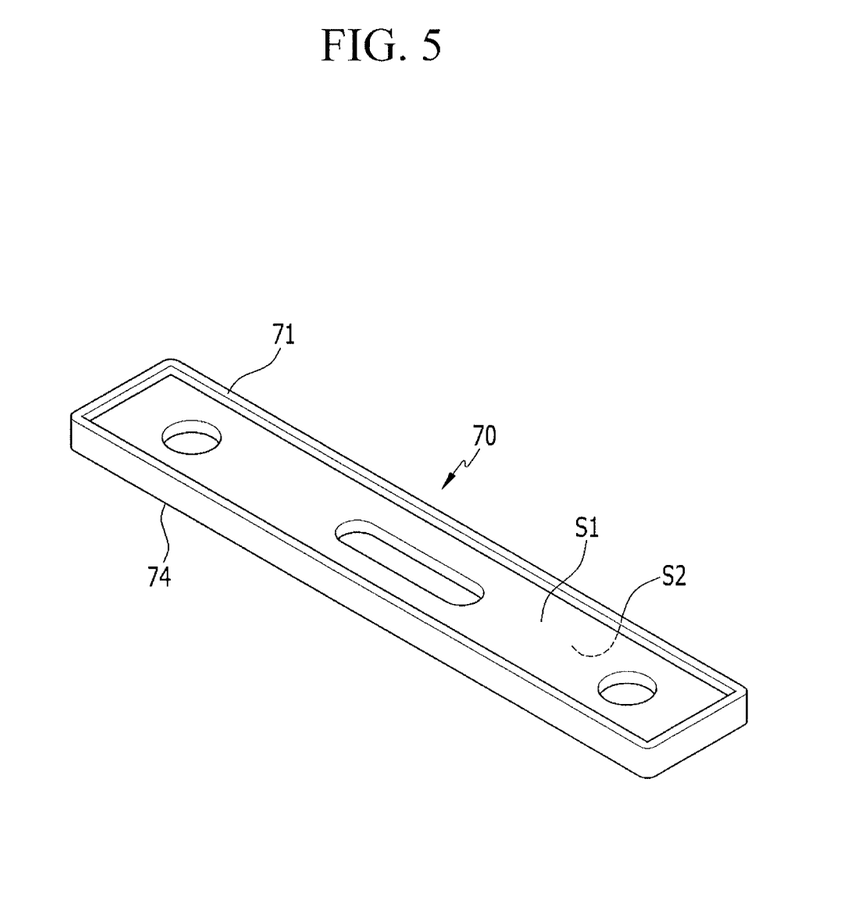
FIG. 5 illustrates a perspective view illustrating a cap plate according to a second exemplary embodiment.
Figure 6:
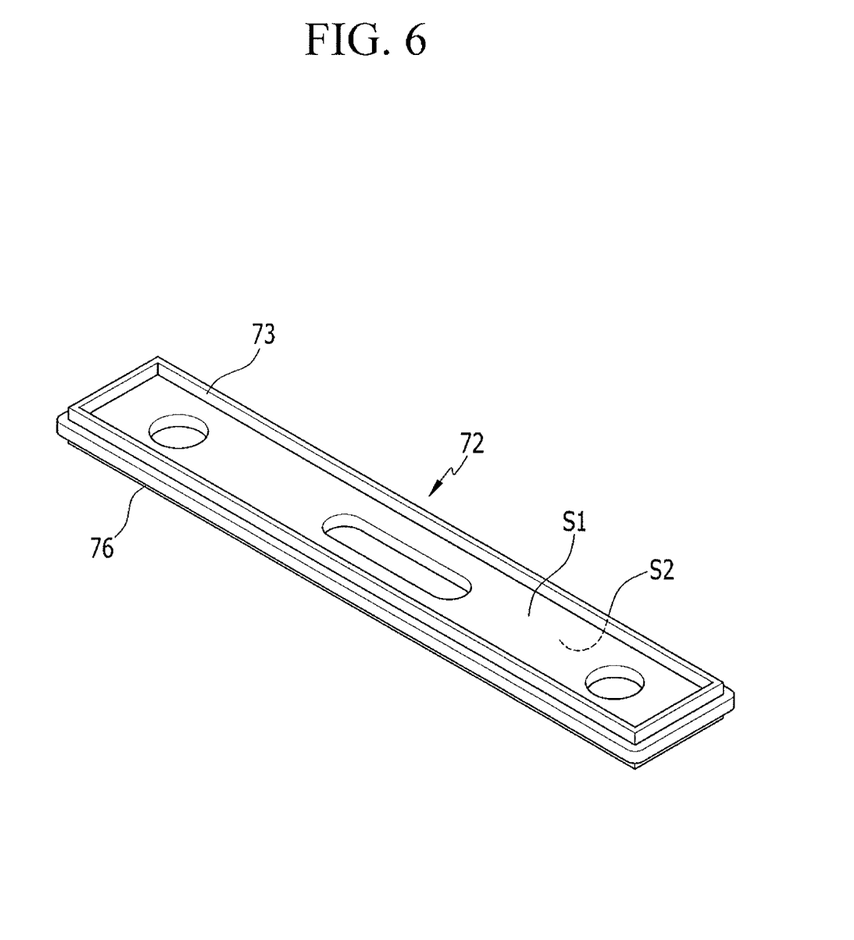
FIG. 6 illustrates a bottom perspective view illustrating a cap plate according to a second exemplary modification.

FIG. 5 is a perspective view illustrating a cap plate 70 according to a second exemplary embodiment, and FIG. 6 is a bottom perspective view illustrating a cap plate 72 according to a second exemplary modification.

Figure 4:
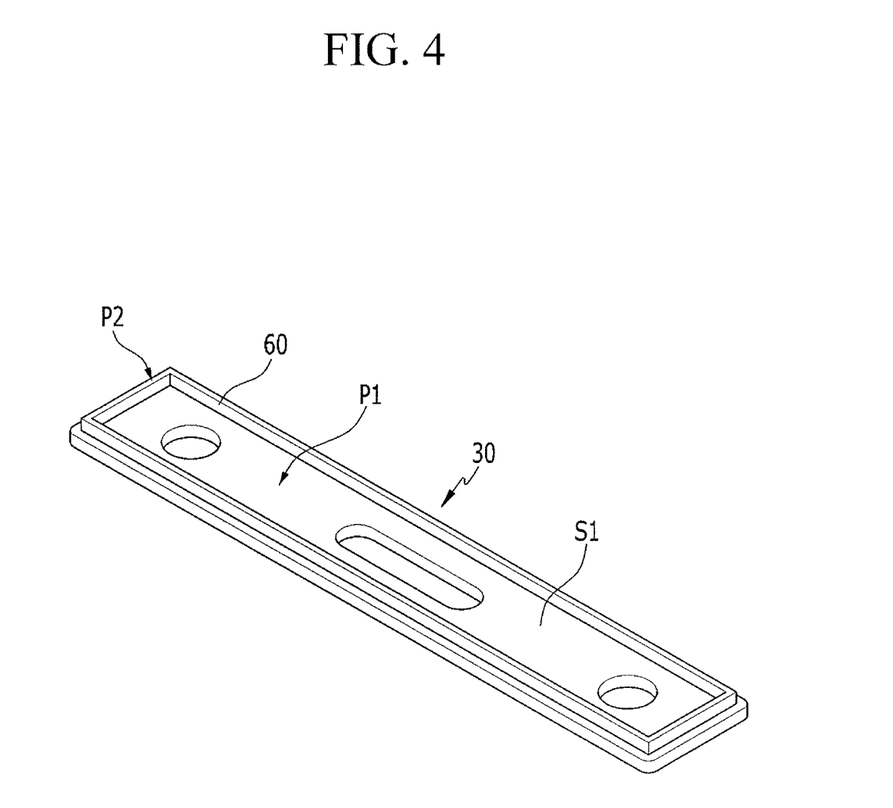
FIG. 4 illustrates a bottom perspective view illustrating a cap plate according to a first exemplary modification.

The cap plate 70 of FIG. 5 and the cap plate 72 of FIG. 6, respectively, have the same basic configuration as the cap plate of FIG. 3 and the cap plate of FIG. 4. However, the cap plates 70 and 72 respectively include first barriers 71 and 73 on the first surface S1 and second barriers 74 and 76 on the second surface S2. The second barriers 74 and 76 respectively have shapes corresponding to the first barriers 71 and 72. According to the second exemplary embodiment and the second exemplary modification, strength of the cap plates 70 and 72 may be further improved by the barriers on both the first surface S1 and the second surface S2.

Figure 7:
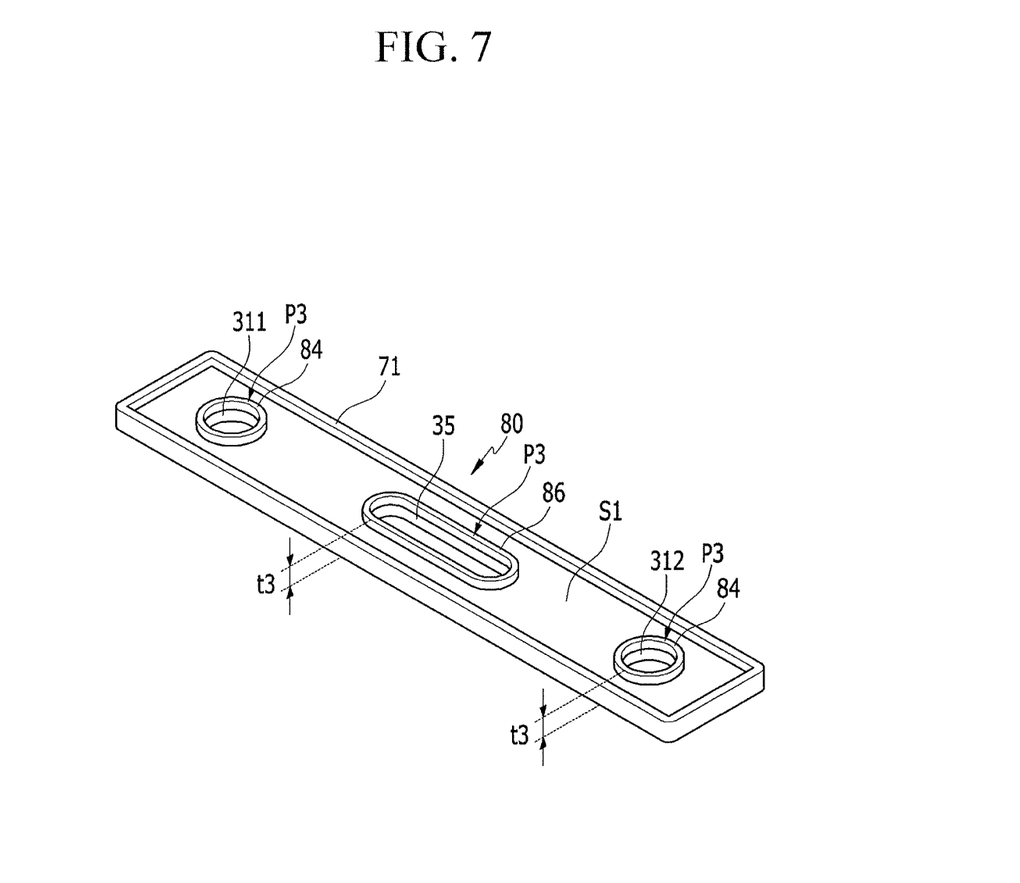
FIG. 7 illustrates a bottom perspective view illustrating a cap plate according to a third exemplary embodiment.
Figure 8:
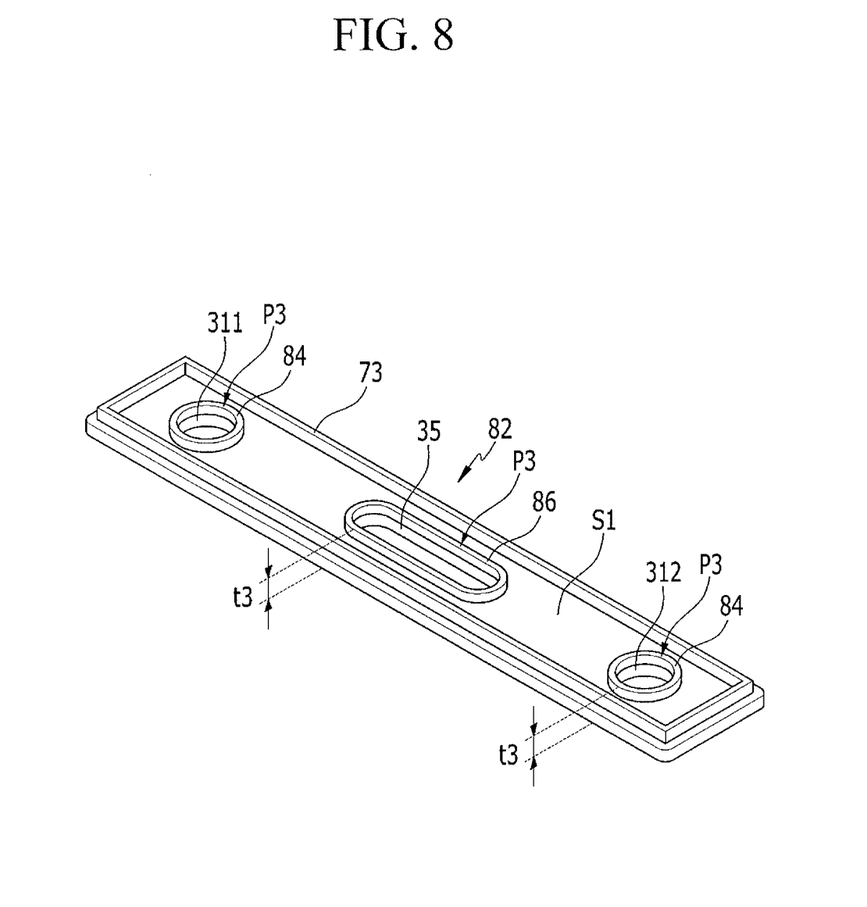
FIG. 8 illustrates a bottom perspective view illustrating a cap plate according to a third exemplary modification.

FIG. 7 is a bottom perspective view illustrating a cap plate 80 according to a third exemplary embodiment, and FIG. 8 is a bottom perspective view illustrating a cap plate 82 according to a third exemplary modification.

The cap plate 80 of FIG. 7 and the cap plate 82 of FIG. 8, respectively, have the same basic configuration as the cap plate of FIG. 3 and the cap plate of FIG. 4. However, the cap plates 80 and 82 respectively have first barriers 71 and 73 on the first surface S1 and third portions P3 including third barriers 84 and 86, which protrude on the first surface S1 along the circumferences of the terminal holes 311 and 312 and the vent hole 35. A thickness t3 of the third portion P3 is thicker than the first thickness t1. According to the third exemplary embodiment and the third exemplary modification, the strength of cap plates 80 and 82 may be further improved by the barriers at edges thereof and, also, around the terminal holes 311 and 312 and the vent hole 35.

By way of summation and review, a cap plate is coupled, e.g., welded, to an opening of the case through a series of processes, thereby establishing a case having an outer appearance of one unit battery. As such, the cap plate provides strength to the case.

Exemplary embodiments disclose a rechargeable battery including a cap plate having improved strength by differently adjusting thicknesses of portions of the cap plate. By adjusting thicknesses of each portion of the cap plate, it is possible to improve the strength of a cap plate and prevent deformation of a rechargeable battery due to external impact.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery comprising:
a case including an internal space and an opening; and
a cap plate coupled to the case to cover the opening,
wherein the cap plate comprises:
  a first portion having a first thickness; and
  a second portion having a second thickness that is thicker than the first thickness, wherein
the second portion includes:
  a first barrier protruding from a first surface of the cap plate toward an outside of the case and being continuously disposed along an edge of the cap plate, and
  a second barrier protruding from a second surface of the cap plate toward the internal space of the case and being continuously disposed along the edge of the cap plate, the second surface of the cap plate being opposite to the first surface of the cap plate, and wherein
the first and second barriers of the second portion of the cap plate are symmetric to one another with respect to the first portion of the cap plate.

2. The rechargeable battery as claimed in claim 1, wherein a circumferential surface of the second barrier coincides with a circumferential surface of the cap plate.

3. The rechargeable battery as claimed in claim 2, wherein the cap plate includes a terminal hole, a vent hole, and a third portion disposed along a circumference of the terminal hole and a circumference of the vent hole, the third portion having a third thickness that is thicker than the first thickness.

4. The rechargeable battery as claimed in claim 3, wherein the third portion includes a third barrier protruding toward the internal space of the case from the second surface of the cap plate.

5. The rechargeable battery as claimed in claim 1, wherein a circumferential surface of the second barrier does not coincide with a circumferential surface of the cap plate.

6. The rechargeable battery as claimed in claim 5, wherein the cap plate includes a terminal hole, a vent hole, and a third portion disposed along a circumference of the terminal hole and a circumference of the vent hole, the third portion having a third thickness that is thicker than the first thickness.

7. The rechargeable battery as claimed in claim 6, wherein the third portion includes a third barrier protruding toward the internal space of the case from the second surface of the cap plate.

8. The rechargeable battery as claimed in claim 1, wherein the cap plate includes a terminal hole, a vent hole, and a third portion disposed along a circumference of the terminal hole and a circumference of the vent hole, the third portion having a third thickness that is thicker than the first thickness.

9. The rechargeable battery as claimed in claim 8, wherein the third portion includes a third barrier protruding toward the internal space of the case from the second surface of the cap plate.

10. A rechargeable battery comprising:
a case including an internal space and an opening; and
a cap plate coupled to the case to cover the opening, the cap plate having a terminal hole and a vent hole,
wherein the cap plate comprises:
  a first portion having a first thickness;

a second portion continuously disposed along an edge of the cap plate and having a second thickness that is thicker than the first thickness; and a third portion having a third thickness that is thicker than the first thickness, wherein the third portion includes:

a first barrier protruding from a first surface of the cap plate toward the internal space of the case from a surface of the cap plate and being continuously disposed along an edge of the terminal hole and an edge of the vent hole, and a second barrier protruding from a second surface of the cap plate toward an outside of the case and being continuously disposed along the edge of the terminal hole and the edge of the vent hole, the second surface of the cap plate being opposite to the first surface of the cap plate, and wherein the first and second barriers of the third portion of the cap plate are symmetric to one another with respect to the first portion of the cap plate.

* * * * *